(12) United States Patent
Davies

(10) Patent No.: US 11,716,203 B2
(45) Date of Patent: *Aug. 1, 2023

(54) SECURE TRANSMISSION

(71) Applicant: Y R Free Labs Limited, Warrington (GB)

(72) Inventor: Phil Davies, Pentre Halkyn (GB)

(73) Assignee: Y R FREE LABS LIMITED, Warrington (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,634

(22) Filed: Jul. 15, 2022

(65) Prior Publication Data

US 2022/0353088 A1 Nov. 3, 2022

Related U.S. Application Data

(63) Continuation of application No. 16/375,220, filed on Apr. 4, 2019, now Pat. No. 11,405,214.

(51) Int. Cl.
*H04L 9/32* (2006.01)
*H04L 9/08* (2006.01)
(Continued)

(52) U.S. Cl.
CPC ............ *H04L 9/3242* (2013.01); *G06F 21/64* (2013.01); *H04L 9/0825* (2013.01);
(Continued)

(58) Field of Classification Search
CPC ... H04L 9/3242; H04L 9/0825; H04L 9/0863; H04L 9/3213; H04L 9/3239;
(Continued)

(56) References Cited

U.S. PATENT DOCUMENTS 7,340,602 B2 * 3/2008 Serret-Avila ........ H04L 63/0428
713/176
7,689,900 B1 3/2010 Fifield et al.
(Continued)

FOREIGN PATENT DOCUMENTS

WO WO 2016/063044 4/2016
WO WO 2019/020194 1/2019

OTHER PUBLICATIONS

Bojinov et al., "Mobile Device Identification via Sensor Fingerprinting", arXiv: 1408.1416v 1, Aug. 6, 2014, 14 pages.
(Continued)

*Primary Examiner* — Cheng-Feng Huang
(74) *Attorney, Agent, or Firm* — Dority & Manning, PA

(57) ABSTRACT

A method for providing evidential data is described includes obtaining data items, generating a respective first hash value for each data item, generating a second hash value for a data set comprising the first hash values but excluding the one or more data items, obtaining one or more transaction identifiers including one or more static identifiers, generating a respective third hash value for each of the one or more static identifiers, transmitting a first message comprising the one or more data items, the one or more first hash values, the second hash value, and the one or more third hash values to a server.

19 Claims, 7 Drawing Sheets

(51) Int. Cl.
*G06F 21/64* (2013.01)
*H04L 9/40* (2022.01)

(52) U.S. Cl.
CPC .......... *H04L 9/0863* (2013.01); *H04L 9/3213* (2013.01); *H04L 9/3239* (2013.01); *H04L 63/0876* (2013.01); *H04L 63/123* (2013.01); *H04L 63/126* (2013.01)

(58) Field of Classification Search
CPC . H04L 63/0876; H04L 63/123; H04L 63/126; G06F 21/64
See application file for complete search history.

(56) References Cited

U.S. PATENT DOCUMENTS

| | | | | |
|---|---|---|---|---|
| 9,735,966 | B2* | 8/2017 | Davies | H04L 63/12 |
| 9,853,977 | B1* | 12/2017 | Laucius | H04L 63/0815 |
| 9,942,231 | B1 | 4/2018 | Laucius | |
| 10,063,548 | B1 | 8/2018 | Laucius | |
| 10,484,376 | B1 | 11/2019 | Laucius | |
| 2005/0235154 | A1* | 10/2005 | Serret-Avila | G06F 21/53 |
| | | | | 713/176 |
| 2007/0050622 | A1 | 3/2007 | Rager et al. | |
| 2008/0155260 | A1* | 6/2008 | Perez | H04W 12/041 |
| | | | | 713/169 |
| 2009/0024848 | A1* | 1/2009 | Takasugi | H04L 63/0869 |
| | | | | 713/169 |
| 2013/0174231 | A1* | 7/2013 | Stavropoulos | H04L 63/08 |
| | | | | 726/5 |
| 2013/0212385 | A1* | 8/2013 | Schechter | H04L 9/0877 |
| | | | | 713/168 |
| 2015/0095648 | A1* | 4/2015 | Nix | H04L 9/32 |
| | | | | 713/170 |
| 2015/0195280 | A1* | 7/2015 | Toyonaga | H04L 63/0428 |
| | | | | 713/155 |
| 2016/0119145 | A1* | 4/2016 | Ridd | G06F 21/64 |
| | | | | 713/168 |
| 2017/0272251 | A1* | 9/2017 | Osheter | H04L 63/0876 |
| 2019/0104121 | A1* | 4/2019 | Khandani | H04L 9/0891 |
| 2019/0289017 | A1* | 9/2019 | Agarwal | H04L 9/12 |
| 2020/0127837 | A1* | 4/2020 | Kaladgi | H04L 63/10 |

OTHER PUBLICATIONS

Harlo "Introducing InformaCam—The Guardian Project", Jan. 20, 2012, Retrieved from Internet: httos://Quardianoroiect.info/2012/01/20/introducing-informacam/, retrieved on Mar. 16, 2022, 6 pages.
Internet Society Chapters Webcasting: "The Guardian Project's InformaCam @TA3M Nyc", Jul. 23, 2013, Retrieved from Internet: https://www.youtube.com/watch?v=rqR5K_6xwHO, retrieved on Mar. 16, 2022, 3 pages.
Srinivas, "Secure and efficient user authentication scheme for multi-gateway wireless sensor networks", 2017, Ad Hoc Networks, vol. 54, pp. 147-169.
International Search Report and Written Opinion for PCT/EP2020/059568, dated Jun. 29, 2020, 13 pages.
Mylonas et al., "Smartphone Sensor Data as Digital Evidence", Computers & Security, vol. 38, Mar. 28, 2013, pp. 51-75.
U.S. Non-final Office Action for corresponding U.S. Appl. No. 16/375,220, dated Mar. 29, 2021, 21 pages.
U.S. Final Office Action for corresponding U.S. Appl. No. 16/375,220, dated Sep. 21, 2021, 23 pages.
U.S. Notice of Allowance for corresponding U.S. Appl. No. 16/375,220, dated Mar. 30, 2022, 16 pages.

* cited by examiner

SECURE TRANSMISSION

BACKGROUND

Mobile computing devices, such as mobile telephones, smartphones, tablet computers, etc. often comprise, or have access to, an array of sensors such as image sensors and sound sensors. While commonly used to record events for personal consumption, such recordings are generally unsuitable for use as evidence in proceedings in which the authenticity, accuracy and/or provenance of those recordings may require verification.

The rapid proliferation of mobile devices is such, however, that mobile devices are often present in circumstances in which such evidential data may be usefully obtained. It would therefore be beneficial if such mobile devices were able to obtain and provide evidential quality recordings of transactions or events. Such evidential quality recordings may have uses, for example, in legal proceedings, insurance claims, etc.

It is an object of the present invention to obviate or mitigate at least one of the problems of the prior art whether identified herein or elsewhere.

SUMMARY

According to a first aspect described herein, there is provided a method for providing evidential data, comprising at a mobile device: establishing one or more first secret tokens with a server; obtaining one or more data items from one or more sensors; combining the one or more data items with at least one of the one or more first secret tokens to provide one or more modified data items; generating a respective first hash value for each of the one or more modified data items, thereby generating one or more first hash values; generating a second hash value for a data set comprising each of the one or more first hash values but excluding the one or more data items; transmitting a first message comprising the one or more data items, the one or more first hash values and the second hash value to the server; obtaining one or more transaction identifiers, the one or more transaction identifiers including one or more static identifiers; transmitting an indication of the static identifiers to the server, wherein transmitting the indication of the static identifiers comprises generating a respective third hash value for each of the one or more static identifiers, and the indication includes the third hash values; and establishing one or more second secret tokens with the server after transmission of the first message, the one or more second secret tokens for combining with one or more second data items obtained from the one or more sensors for generating a second message.

That is, the data set comprises each of the one or more first hash values, and may comprise further data other than any one of the one or more data items. The data set is free of the one or more data items. The further data may be at least one of the transaction identifiers.

By generating a respective first hash value for each of the one or more modified data items and generating a second hash value for a data set comprising each of the one or more first hash values, the second hash value is able to represent the characteristic of the one or more data items and therefore can be used as an indicator to indicate whether the data items are modified/corrupted during transmission of the first message from the mobile device to the server.

The one or more data items obtained from sensors of the mobile device may comprise photos, videos and/or sound recordings. It is a general trend for mobile devices to provide photos, videos and audios with enhanced resolutions. Therefore, it is not uncommon that the size of the one or more data items obtained from the sensors of the mobile device may be substantial (e.g., up to hundreds of Megabytes or even multiple Gigabytes). Processing the one or more data items (such as, by generating the second hash value for the data items) is likely to consume a substantial amount of computing resource and battery power of the mobile device. By excluding the one or more data items from the data set for which the second hash value is generated, the data set can be kept at a relatively small data size. Thus, the method may also work on mobile devices of lower specification (e.g., that do not have a fast CPU processing speed and a large battery capacity) in order to compute the second hash value for the data set. Accordingly, excluding the one or more data items from the data set reduces the requirements with respect to the hardware of the mobile device, and allows various types of mobile devices (from low-end to high-end) to provide evidential data according to the first aspect. Further, by excluding the one or more data items from the data set, a mobile device with the same hardware is able to compute the second hash value at a faster speed while using less electrical energy, as compared to the case where the one or more data items are included within the data set. This is beneficial for improving the processing speed, prolonging the battery life of the mobile device and indeed for allowing capture and transmission of evidential data even where battery may already be depleted.

Therefore, generating a second hash value for a data set comprising each of the one or more first hash values but excluding the one or more data items is advantageous in that it relaxes the restriction imposed on the hardware of the mobile device and improves the processing speed and prolongs the battery life of the mobile device, while still allowing the capture of evidential data by enabling detection of modification of the data items.

The data set may consist of each of the one or more first hash values. That is, the data set comprises the one or more first hash values only and does not comprise any further data.

Each transaction identifier may be suitable for identifying a property of the mobile device.

Each static identifier may be suitable for identifying a static property of the mobile device.

Calculating each respective third hash value may comprise modifying each of the plurality of static identifiers with at least one of the one or more first secret tokens and calculating each of said third hash values based upon the modified static identifiers.

The transaction identifiers may comprise one or more variable identifiers. Each variable identifier may be suitable for identifying a variable property of the mobile device.

The method may further comprise transmitting an indication of the variable identifiers to the server. Transmitting the indication of the variable identifiers may comprise transmitting the variable identifier to the server.

The method may further comprise an initialisation procedure, the initialisation procedure comprising transmitting a plurality of initialisation identifiers to the server.

The initialisation identifiers may comprise one or more static identifiers and/or one or more variable identifiers.

The transaction identifiers may be based upon the initialisation identifiers to allow comparison at the server between values of the initialisation identifiers and the transaction identifiers.

The one or more sensors may comprise at least one sensor from a group comprising a camera of the mobile device and a microphone of the mobile device.

The one or more data items may comprise at least one of: one or more still images, one or more videos, and one or more sound recordings.

The one or more static identifiers may comprise at least one identifier from a group consisting of: an identification number of a battery of the mobile device, an IMEI number of the mobile device, and a telephone number of the mobile device.

The one or more variable identifiers may comprise at least one identifier from the group consisting of: a geographical location of the mobile device, a date and time reported by the mobile device, a duration of time since the mobile device was turned on, an indication of other devices detected by the mobile device and a file structure of the mobile device.

The one or more first secret tokens may be established with the server before transmitting the first message.

According to a second aspect described herein, there is provided a method for receiving evidential data comprising, at a server: establishing one or more first secret tokens with a mobile device; receiving a first message which comprises one or more first data items, one or more first hash values and a second hash value from the mobile device, the one or more data items obtained from one or more sensors, wherein each of the one or more first hash values are hash values generated based upon a respective one of the one or more first data items combined with at least one of the one or more first secret tokens, and the second hash value is a hash value generated based upon a data set comprising each of the one or more first hash values but excluding the one or more data items; receiving a plurality of initialization identifiers including a first static identifier from the mobile device; receiving one or more transaction identifiers including an indication of a corresponding static identifier, the indication comprising a third hash value based upon the corresponding static identifier; and comparing the first static identifier with the corresponding static identifier, wherein the comparing comprises generating a fourth hash value based upon the first static identifier and comparing the fourth hash value with the third hash value; and establishing one or more second secret tokens with the mobile device after receipt of the first message, the one or more second secret tokens for combining by the mobile device with one or more second data items obtained from the one or more sensors to generate a second message.

The method may further comprise: modifying each of the received one or more data items with at least one of the one or more first secret tokens; generating a respective first comparison hash value for each of the modified received one or more data items; comparing each respective first comparison hash value to a corresponding one of the first hash values; and providing an indication for each respective first comparison hash value that does not match a corresponding one of the first hash values.

Each of the one or more transaction identifiers may be suitable for identifying a property of the mobile device.

The first static identifier may be suitable for identifying a static property of the mobile device.

The third hash value may be generated by the mobile device by modifying the corresponding static identifier with at least one of the one or more first secret tokens and calculating each the third hash values based upon the modified corresponding static identifier.

Generating the fourth hash value may comprise modifying the first static identifier with at least one of the one or more first secret tokens and calculating the fourth hash value based upon the modified first static identifier.

The initialisation identifiers may comprise a first variable identifier suitable for indicating a variable property of the mobile device. The received transaction identifiers may comprise a corresponding variable identifier. The method may further comprise comparing the first variable identifier with the corresponding variable identifier. Comparing the first variable identifier with the corresponding variable identifier may comprise determining whether a difference between the first variable identifier and the second variable identifier is within a predetermined bound.

The one or more first secret tokens may be established with the mobile device before receiving the first message.

According to a third aspect described herein, there is provided a non-transitory computer-readable storage medium storing a set of instructions for execution by a general purpose computer to provide evidential data at a mobile device, the set of instructions comprising: a first establishing code segment for establishing one or more first secret tokens with a server; a first obtaining code segment for obtaining one or more data items from one or more sensors; a modifying code segment for combining the one or more data items with at least one of the one or more first secret tokens to provide one or more modified data items; a first generating code segment for generating a respective first hash value for each of the one or more modified data items, thereby generating one or more first hash values; a second generating code segment for generating a second hash value for a data set comprising each of the one or more first hash values but excluding the one or more data items; a transmitting code segment for transmitting a first message comprising the one or more data items, the one or more first hash values and the second hash value to the server; a second obtaining code segment for obtaining one or more transaction identifiers, the one or more transaction identifiers including one or more static identifiers; a second transmitting code segment for transmitting an indication of the one or more static identifiers to the server, including generating a respective third hash value for each of the one or more static identifiers, wherein the indication includes the third hash values; and a second establishing code segment for establishing one or more second secret tokens with the server after transmission of the first message, the one or more second secret tokens for combining with one or more second data items obtained from the one or more sensors for generating a second message.

The one or more first secret tokens may be established with the server before transmission of the first message.

According to a fourth aspect described herein, there is provided a method for providing evidential data, comprising at a mobile device: establishing one or more first secret tokens with a server; obtaining one or more data items from one or more sensors; modifying the one or more data items with at least one of the one or more first secret tokens to provide one or more modified data items; generating a respective first hash value for each of the one or more modified data items, thereby generating one or more first hash values; generating a second hash value for a data set comprising each of the one or more first hash values but excluding the one or more data items; and transmitting the one or more data items, the one or more first hash values and the second hash value to the server.

The data set may consist of the one or more first hash values.

The method may further comprise obtaining one or more transaction identifiers, each transaction identifier being suitable for identifying a property of the mobile device; and transmitting an indication of said transaction identifiers to the server.

The data set may comprise one or more of the transaction identifiers.

The one or more transaction identifiers may comprise one or more static identifiers, wherein each static identifier is suitable for identifying a static property of the mobile device.

Transmitting an indication of the static identifiers to the server may comprise generating a respective third hash value for each of the one or more static identifiers, wherein the indication comprises the third hash values.

The data set may comprise the third hash values.

Calculating each respective third hash value may comprise modifying each of the plurality of static identifiers with at least one of the one or more first secret tokens and calculating each of said third hash values based upon the modified static identifiers.

The transaction identifiers may comprise one or more variable identifiers and each variable identifier may be suitable for identifying a variable property of the mobile device. Transmitting an indication of the variable identifiers to the server may comprise transmitting the variable identifier to the server.

The data set may comprise the variable identifiers.

The method may further comprise an initialisation procedure. The initialisation procedure may comprise transmitting a plurality of initialisation identifiers to the server.

The initialisation identifiers may comprise one or more static identifiers and/or one or more variable identifiers.

Transmitting a plurality of initialisation identifiers may comprise obtaining the plurality of initialisation identifiers, encrypting the obtained initialisation identifiers and transmitting the encrypted initialisation identifiers to the server.

The transaction identifiers may be based upon the initialisation identifiers to allow comparison at the server between values of the initialisation identifiers and the transaction identifiers.

The one or more sensors may comprise at least one sensor from the group comprising a camera of the mobile device and a microphone of the mobile device.

The one or more data items may comprise one or more still images.

The one or more data items may comprise one or more videos.

The one or more data items may comprise one or more sound recordings.

The one or more static identifiers may comprise at least one identifier from the group comprising an identification number of a battery of the mobile device, an IMEI number of the mobile device telephone number of the mobile device.

The one or more variable identifiers may comprise at least one identifier from the group comprising a geographical location of the mobile device, a date and time reported by the mobile device, a duration of time since the mobile device was turned on, an indication of other devices detected by the mobile device and a file structure of the mobile device.

The method may further comprise establishing one or more second secret tokens with the server after transmission of the one or more data items and said first and second hash values.

According to a fifth aspect, there is provided a method for receiving evidential data comprising, at a server: establishing one or more first secret tokens with a mobile device; receiving one or more data items, one or more first hash values and a second hash value from the mobile device; wherein each of the one or more first hash values are hash values generated based upon a respective one of the one or more data items modified with at least one of the one or more first secret tokens; wherein the second hash value is a hash value generated based upon a data set comprising each of the one or more first hash values but excluding the one or more data items.

The method may further comprise modifying each of the received one or more data items with at least one of the one or more first secret tokens; generating a respective first comparison hash value for each of the modified received one or more data items; comparing each respective first comparison hash value to a corresponding one of the first hash values; and providing an indication for each respective first comparison hash value that does not match a corresponding one of the first hash values.

Providing an indication may comprise outputting an indication to a display device, or saving an indication together with the data.

The method may further comprise receiving a plurality of initialisation identifiers from the mobile device; receiving one or more transaction identifiers, each of the one or more transaction identifiers being suitable for identifying a property of the mobile device; and comparing at least one of the initialisation identifiers with at least one of the transaction identifiers.

The method may further comprise transmitting a request for the transaction identifiers based upon the received initialisation identifiers.

The initialisation identifiers may comprise a first static identifier suitable for identifying a static property of the mobile device. The one or more transaction identifiers may comprise an indication of a corresponding static identifier. Comparing at least one of the initialisation identifier may comprise comparing the first static identifier with the corresponding static identifier.

The indication of the static identifier may comprise a third hash value based upon the corresponding static identifier. Comparing the first static identifier with the corresponding static identifier may comprise generating a fourth hash value based on the first static identifier and comparing the fourth hash value with the third hash value.

The third hash value may have been generated by the mobile device performing the steps of modifying the corresponding static identifier with at least one of the one or more first secret tokens and calculating each the third hash values based upon the modified corresponding static identifier. Generating the fourth hash value may comprise modifying the first static identifier with at least one of the one or more first secret tokens and calculating the fourth hash value based upon the modified first static identifier.

The initialisation identifiers may comprise a first variable identifier suitable for indicating variable properties of the mobile device. The received transaction identifiers may comprise a corresponding variable identifier. Comparing the first variable identifier with the corresponding variable identifier may comprise determining whether a difference between the first variable identifier and the second variable identifier are within predetermined bounds.

The initialisation identifiers may comprise at least one of a number of a battery of the mobile device, an IMEI number of the mobile device telephone number of the mobile device.

The one or more variable identifiers may comprise at least one identifier from the group comprising a geographical location of the mobile device, a date and time reported by the mobile device, a duration of time since the mobile device was turned on, an indication of other devices detected by the mobile device and a file structure of the mobile device.

The method may further comprise establishing one or more second secret tokens with the mobile device after receipt of the one or more data items and said first and second hash values.

According to a sixth aspect, there is provided an apparatus for providing evidential data, comprising: a memory storing computer readable instructions configured to cause a computer to carry out a method according to any one of the first aspect, the second aspect, the fourth aspect and the fifth aspect; and a processor configured to execute the computer readable instructions.

It is to be understood that features described with reference to one aspect above may be combined with other aspects.

BRIEF DESCRIPTION OF THE FIGURES

Embodiments of the invention are now described, by way of example only, with reference to the accompanying drawings, in which.

DETAILED DESCRIPTION

Figure 1:
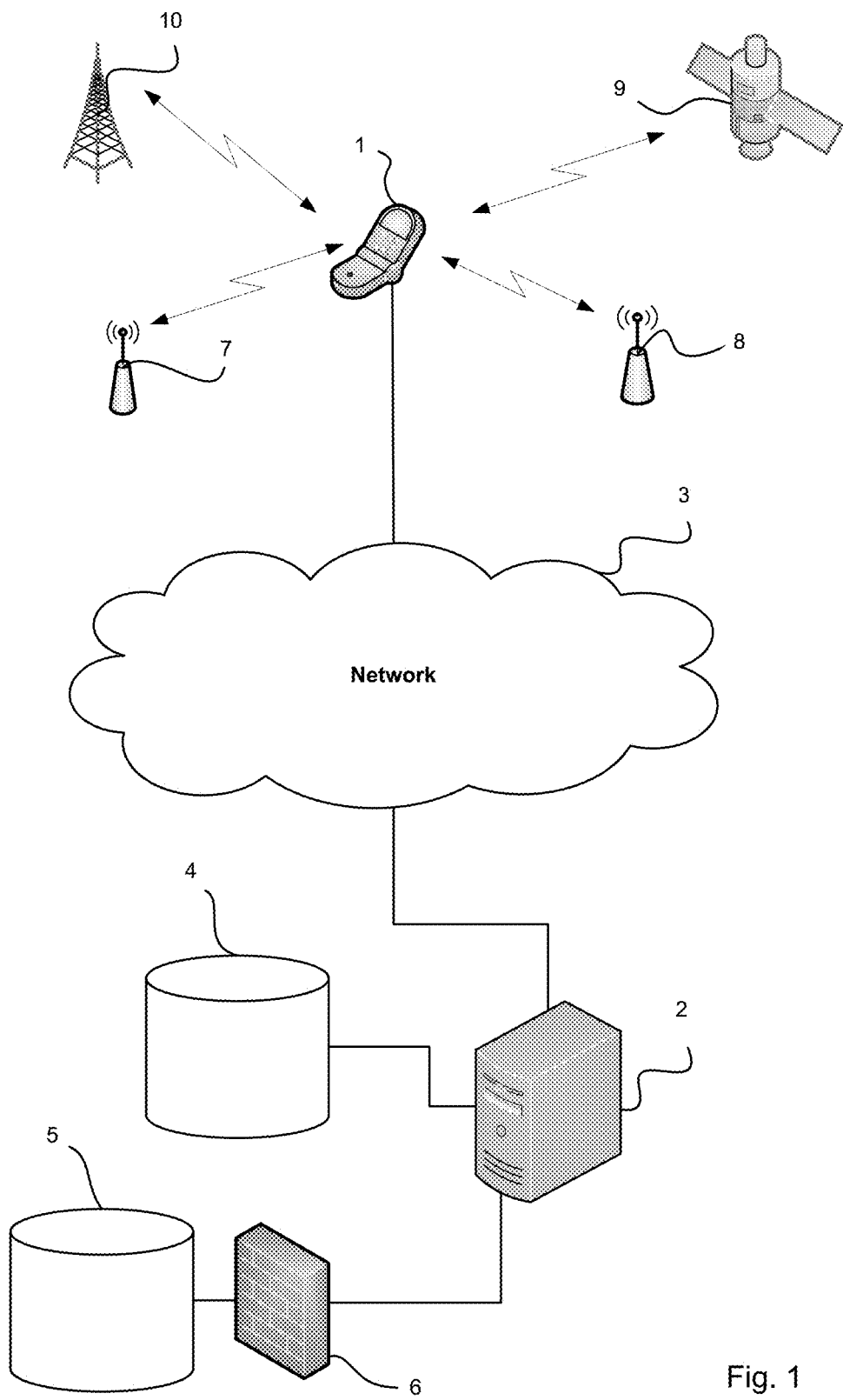
FIG. 1 schematically illustrates an example network of components which may be used to implement an embodiment.

FIG. 1 illustrates a network of computer devices that can be used to implement embodiments of the present invention. A mobile device 1 connects to a server 2 via a network 3. The network 3 may be any suitable public or private network and may be, for example, the Internet. The mobile device 1 may take any form suitable for connection to the network 2. For example, the mobile device 1 may be a mobile telephone, a smartphone, a tablet, etc.

The connections between the server 2, the mobile device 1, and the network 3 may take any appropriate form and may be wired or wireless connections. It will be appreciated that while a single mobile device 1 is illustrated in FIG. 1, this is merely exemplary and any number of mobile device may connect with the server 2.

The mobile device 1 is configured to provide data to the server 2 via the network 3. In particular, the mobile device 1 is configured to provide data relating to incidents that occur in the proximity of the mobile device 1, such as accidents, crimes, etc., for the purpose of evidence. For example, the mobile device 1 may be equipped with recording means such as one or more cameras for recording images or video, microphones for recording sounds, and receivers for recording received radio signals. It will be appreciated that the mobile device 1 may be used to obtain any form of evidential data as required.

The mobile device 1 may communicate with the server 2 from within a local computer application operating on the mobile device 1 (or "app") or via a remote application provided by the server 2 and accessed from the mobile device 1 through, for example, a web browser. Future references to a computer application with which the mobile device 1 may communicate with the server 2 may therefore be either a local computer application or a remote application.

Upon obtaining evidential data, the mobile device 1 transmits the evidential data to the server 2 via the network 3. In particular, the mobile device 1 transmits the evidential data along with further data to allow the server 2 and/or third parties (such as police or judicial authorities) to determine that the evidential data originates from the mobile device 1 and has not been modified, or otherwise tampered, with subsequent to its creation and/or transmission to the server 2.

The server 2 is connected to a public data store 4 and a private data store 5. The private data store 5 may be isolated from the network 3 to prevent access to files stored thereon by, for example, the mobile device 1, and any other device. A firewall 6 may be connected between the private data store 5 and the server 2.

The mobile device 1 may operate in the vicinity of one or more location indication devices. As used herein, the term location indication device means any device which may be used to provide indications of the current geographical location of the mobile device 1 or indications of geographical locations through which the mobile device 1 has passed. For example, the mobile device 1 may pass in and out of range of one or more wireless access points or base stations 7, 8 (such as WiFi access points and/or WiMAX base stations, for example), one or more global positioning satellites (GPS) 9 and one or more cellular network antennas 10.

Figure 2A:
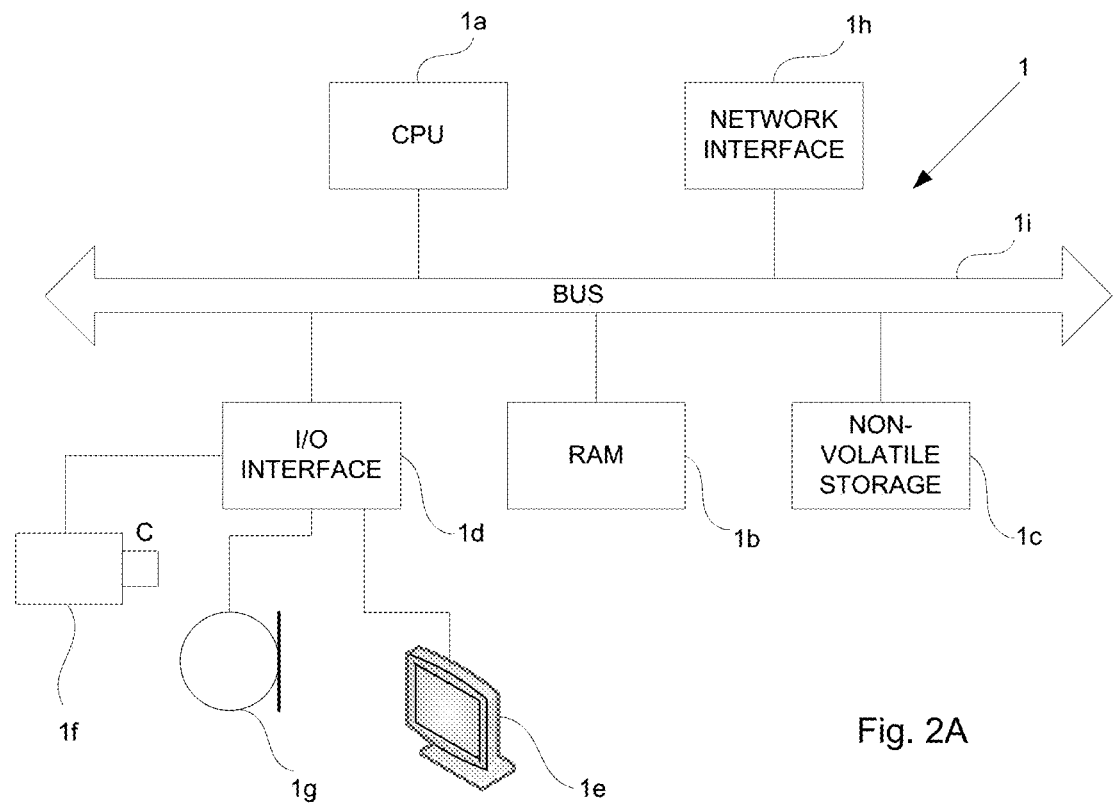
FIG. 2A schematically illustrates an example configuration components which may be used to implement the mobile device of FIG. 1.

FIG. 2A shows an exemplary schematic illustration of components which can be used to provide the mobile device 1 in accordance with some embodiments of the present invention. It can be seen that the mobile device 1 comprises a CPU 1a which is configured to read and execute instructions stored in a random access memory (RAM) 1b which, in this example, takes the form of volatile memory 1b. It will be appreciated that non-volatile RAM may equally be used in such an embodiment. The RAM 1b stores instructions for execution by the CPU 1a and data used by those instructions. For example, the instructions loaded into the RAM 1b may provide one or more computer programs that are operable to obtain evidential data and to transmit that evidential data to the server 2.

The mobile device 1 further comprises non-volatile storage 1c, which may take any suitable form, such as, for example, a hard disk drive (HDD) or solid state drive (SSD). Computer readable instructions for facilitating the capture, storage and transmission of evidential data to the server 2 may be stored in the non-volatile storage 1c.

The mobile device 1 further comprises an I/O interface 1d to which are connected peripheral devices used in connection with the mobile device 1. More particularly, a display 1e is configured so as to display output from the mobile device 1. The display 1e may be a touchscreen display, allowing a user to provide input to the mobile device 1e. Other input devices are also connected to the I/O interface 1d. Such input devices include a camera 1f and a microphone 1g, thereby allowing a user of the mobile device 1 to obtain images (including video and still) and sound. It will be appreciated that other input devices may equally be provided. For example, dedicated biometric scanning means, such as fingerprint scanners, may be provided.

A network interface 1h allows the mobile device 1 to be connected to appropriate computer networks, such as the network 3, so as to receive and transmit data from and to other computing devices such as the server 2. The network interface 1h may also allow connection with, or detection of signals from, location indication devices such as the location indication devices 7 to 10.

The CPU 1a, volatile memory 1b, RAM 1c, I/O interface 1d, and network interface 1h, are connected together by a bus 1i.

It will be appreciated that the arrangement of components illustrated in FIG. 2A is merely exemplary, and that the mobile device 1 may comprise additional or fewer components than those illustrated in FIG. 2A.

Figure 2B:
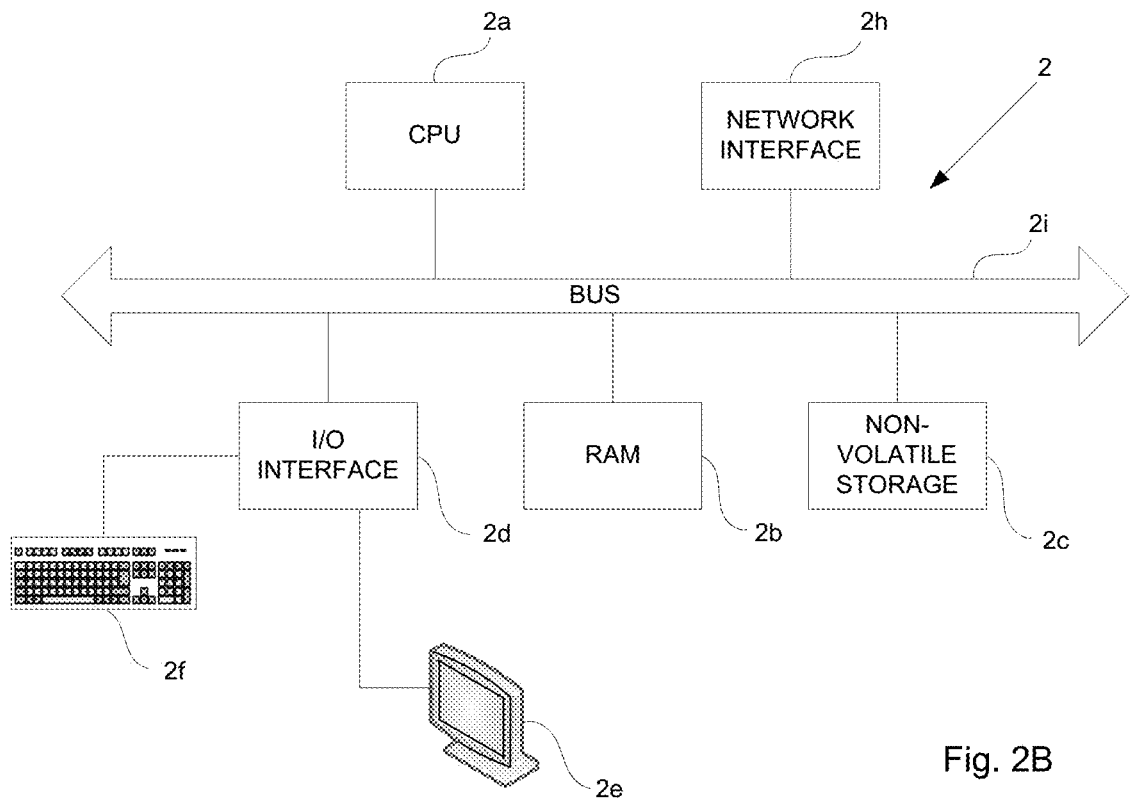
FIG. 2B schematically illustrates an example configuration components which may be used to implement the server of FIG. 1.

FIG. 2B shows a schematic illustration of components which can be used to provide the server 2 in accordance with some embodiments of the present invention. It can be seen that, at a schematic level, the server 2 may be implemented similarly to the mobile device 1. In particular, the server 2 may comprise a CPU 2a which is configured to read and execute instructions stored in a random access memory (RAM) 2b. The RAM 2b stores instructions for execution by the CPU 2a and data used by those instructions. For example, the instructions loaded into the RAM 2b may provide one or more computer programs that are operable to facilitate receipt of evidential data from the mobile device 1 and for confirming that the received evidential data is suitable for use as evidence.

The server 2 further comprises non-volatile storage 2c, which may take any suitable form, such as, for example, a hard disk drive (HDD) or solid state drive (SSD). The non-volatile storage 2 may comprise the data stores 4, 5. Alternatively, the data stores 4, 5 may be connected to the server 2 via a storage network (not shown).

The server 2 further comprises an I/O interface 2d to which are connected peripheral devices used in connection with the server 2. More particularly, a display 2e is configured so as to display output from the server 2. The display 2e may be a touchscreen display, allowing a user to provide input to the server 2. Other input devices may also connected to the I/O interface 2d, such as a keyboard 2f. It will be appreciated that other input devices may equally be provided.

A network interface 2h allows the server 2 to be connected to appropriate computer networks, such as the network 3, so as to receive and transmit data from and to other computing devices such as the mobile device 1.

The CPU 2a, volatile memory 2b, RAM 2c, I/O interface 2d, and network interface 2h, are connected together by a bus 2i.

It will be appreciated that the arrangement of components illustrated in FIG. 2B is merely exemplary, and that the server 2 may comprise additional or fewer components than those schematically illustrated in FIG. 2B. Indeed, the server 2 may comprise a plurality of computers, similar to, or arranged differently from, the mobile device 1. For example, the server 2 may comprise a plurality of computers respectively adapted to provide, inter alia, a web server, an application server, a gateway server and a database server, etc., to provide suitable applications to the mobile device 1 over the network 3. That is, it is to be understood that, like the mobile device 1, the server 2 may be implemented using any appropriate configuration as will be readily appreciated by those skilled in the art.

Figure 3:
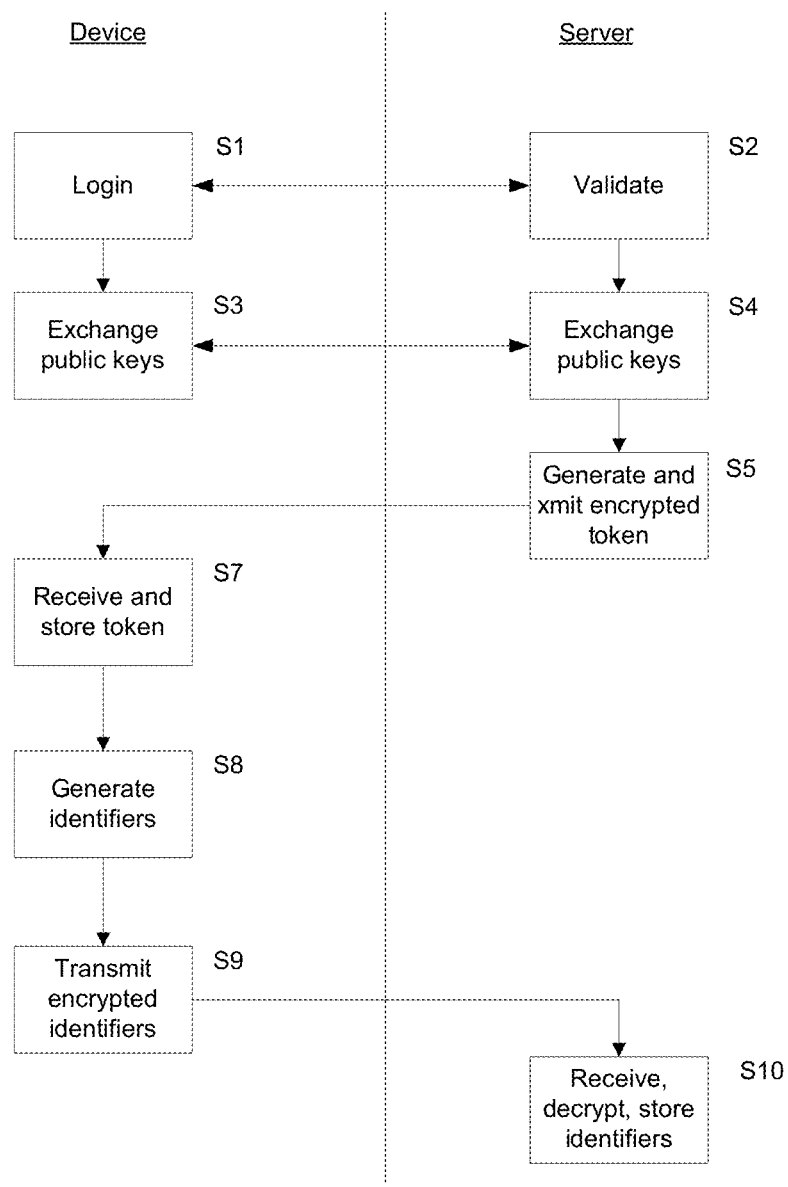
FIG. 3 is a flowchart showing initiation processing carried out by the server and the mobile device of FIG. 1.
Figure 4:
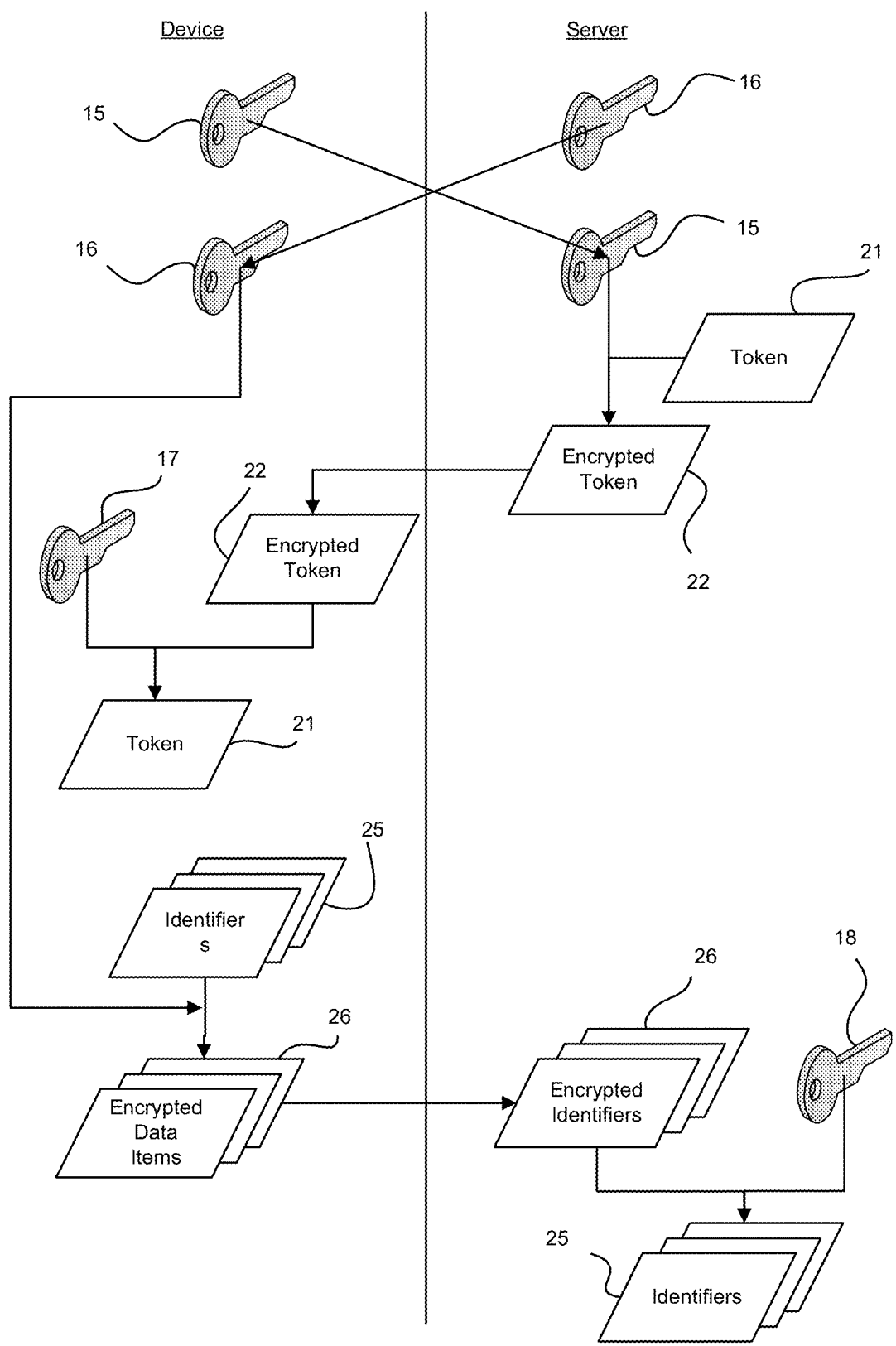
FIG. 4 is a flow diagram showing data generated and exchanged between the server and the mobile device while performing the processing of FIG. 3.

FIG. 3 is a flowchart illustrating an initialisation process that is carried out by the mobile device 1 and the server 2 before transactions for transmission of evidential data between the mobile device 1 to the server 2. FIG. 4 schematically illustrates data that is generated and exchanged by the mobile device 1 and the server 2 during the processing of FIG. 3. It is assumed that in advance of the processing of FIG. 3, a user of the mobile device 1 has registered as a customer or user of a service which receives evidential data. For example, the user of the mobile device 1 may obtain an insurance product, such as vehicle insurance, from an entity that operates the server 2 or on whose behalf the server 2 is operated. In this example, the user 1 may use embodiments described herein to provide evidential data relating to accidents, damage, etc. of a vehicle that is insured.

Prior to the processing of FIG. 3, the entity with whom the user is registered may provide suitable login details for use of the application. Alternatively, the user may establish login details through a registration process conducted through the application, as will be readily appreciated by the skilled person.

At step S1 the user of the mobile device 1 enters their login details into a suitable interface provided by the application. At step S2 the server 2 receives the user's login details and validates that the login details belong to a registered account. Following validation of the login details, from step S1, processing at the mobile device 1 passes to step S3, while processing at the server 2 passes to step S4. At steps S3 and S4 the mobile device 1 and the server 2 exchange public keys for use with asymmetric cryptography. With reference to FIG. 4, the mobile device 1 transmits its public key 15 to the server 2, while the server 2 transmits its public key 16 to the mobile device 1. In FIG. 4, the server 2 is shown as receiving the public key 15 and the mobile device is shown as receiving the public key 16. It will be appreciated that this is merely schematic, and that the server 2 will maintain a copy of the public key 15 while the mobile device 1 will maintain a copy of the public key 16. The mobile device 1 further stores a private key 17 (corresponding to its public key 15), while the server 2 stores a private key 18 (corresponding to its public key 16).

The keys 15, 16, 17, 18 may be generated prior to the processing of FIG. 3 or may be generated as part of the processing of steps S3 and S4. The public and private keys may be generated using any appropriate means as will be readily apparent to the skilled person. As an example only, the public and private keys may be generated using the RSA algorithm.

Upon receipt of the public key 15 from the mobile device 1, processing at the server 2 passes to step S5 at which the server 2 generates a unique, randomly generated, token 21. The token 21 is encrypted using the public key 15 received from the mobile device 1 to generate an encrypted token 22 which can only be decrypted using the private key 17 of the mobile device 1. The token 21 (or data to be sent in combination with the token 21) may additionally be signed (not shown in FIG. 4) by the server 2 using the private key 18. For example, the token 21, or a hash of the token 21, may additionally be encrypted using the private key 18 such that the token 21 can only be decrypted by the mobile device 1 using the public key 16 received from the server 2. In this way, the mobile device 1 can have greater certainty that the token 21 was received from the server 2, and not a third party.

The encrypted token 22 is transmitted to the mobile device 1 and received by the mobile device 1 at step S7. The mobile device 1 decrypts the encrypted token 22 using its private key 17 to obtain the token 21.

After the processing of steps S3 to S7, the mobile device 1 and the server 2 each possess information, in the form of the token 21, known only to each other. It will be appreciated, however, that the processing of steps S3 to S7 are merely exemplary that in practice any suitable means may be used for the mobile device 1 and the server 2 to securely exchange a suitable token. In other embodiments, for example, a plurality of secret tokens may be exchanged.

Processing passes from step S7 to step S8 at which the mobile device 1 generates or obtains a plurality of initialisation identification data items 25. Suitable identification data items include, for example, an International Mobile Station Equipment Identity (IMEI) number of the mobile device 1 (or similar identifiers, such as ESN, MEID, etc.), an International mobile Subscriber Identity (IMSI) number, Service Set Identifier (SSID) history data (i.e. which SSIDs the mobile device 1 has come into contact with), GPS data, an indication of a current local mobile cell, current date and time data, a recorded uptime of the mobile device 1, a last reboot time of the mobile device 1, a bit-rate between the mobile device 1 and the server 2, a file directory structure of the mobile device 1, etc. That is, it will be appreciated that the identification data may comprise any suitable identification data which can be used by the server 2 to ascertain the authenticity of a device claiming to be the mobile device 1 in future transactions.

The identification data may comprise both "static" identifiers and "variable" identifiers. Static identifiers may be identifiers which are not expected to change over time or which are expected to change only infrequently. For example, battery identification numbers, IMEI numbers, file structure data, etc. may be expected to vary infrequently. Variable identifiers may be those identifiers which are expected to change over time. For example, time and data identifiers, location identifiers, SSID history data, etc. may be expected to vary between an initialisation and a first transaction, and between respective transactions.

As is described below in more detail with reference to FIGS. 5 and 6, identifiers may be transmitted to the server 2 from the mobile device 1 during each transaction (i.e. transactions to transmit evidential data). Because static identifiers are not expected to vary frequently, it may not be necessary to re-transmit (after initial transmission during the processing of FIG. 3) each static identifier. Rather, as discussed below, in some embodiments, only a hash value based on each static identifier is transmitted.

The particular set of identification data items 25 obtained or generated by the mobile device 1 may be selected randomly by the mobile device 1 or by a user of the mobile device 1. Alternatively, the set of identification data items may be selected by the server 2 and sent as a request to the mobile device 1. Alternatively, the set of identification data items may be agreed between the server 2 and the mobile device 1 in a handshake operation in which it is determined which data items can be provided. For example, it will be appreciated that different devices (e.g. tablets and mobile telephones) may have different features which limit or facilitate the generation of one or more identification data items.

Having generated the identification data items 25, processing passes from step S8 to step S9 at which the identification data items 25 are encrypted to provide encrypted identification data items 26. In the example embodiment shown in FIG. 4, the identification data items 25 are each encrypted using the public key 16 of the server 2. It is to be appreciated, however, that the identification data items may be encrypted using any appropriate encryption scheme, or transmitted in any appropriately secure manner. For example, the pre-shared token may be used as a symmetric encryption key, and the identification data items may be encrypted using the pre-shared token. In other embodiments, the identification data items 25 may not be encrypted before transmission to the server 2.

The encrypted identification data items 26 are transmitted from the mobile device 1 to the server 2. At step S10, the server 2 receives the encrypted identification data items 26 and, together with the private key 18, the server 2 decrypts the encrypted identification data items 26 to obtain the data items 25.

Figure 5:
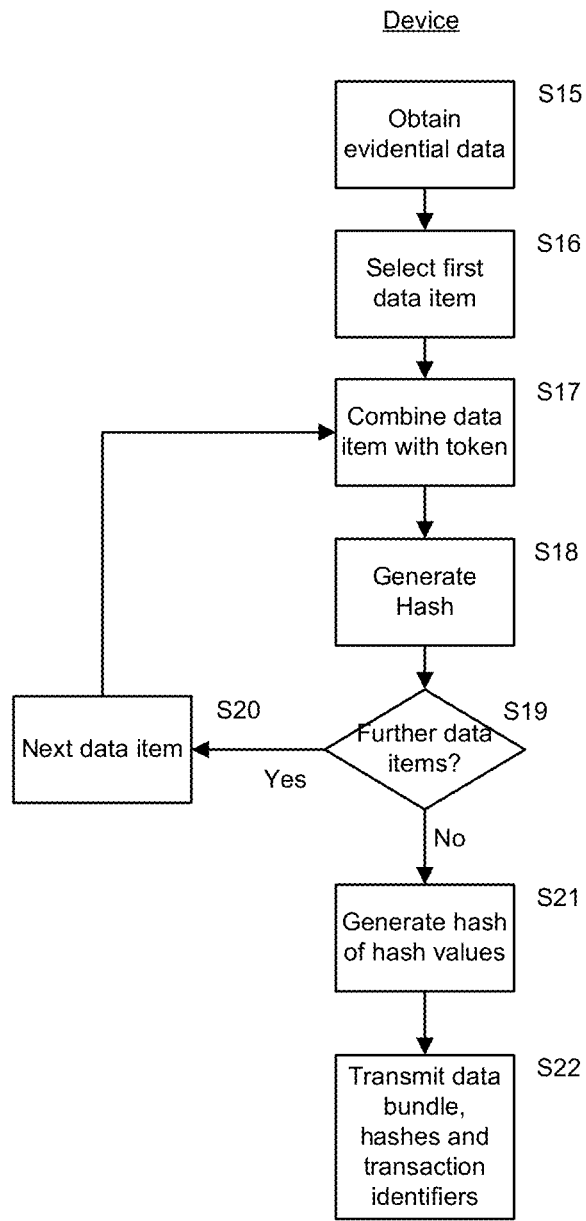
FIG. 5 is a flowchart showing processing carried out by the mobile device of FIG. 1 to transmit evidential data.
Figure 6:
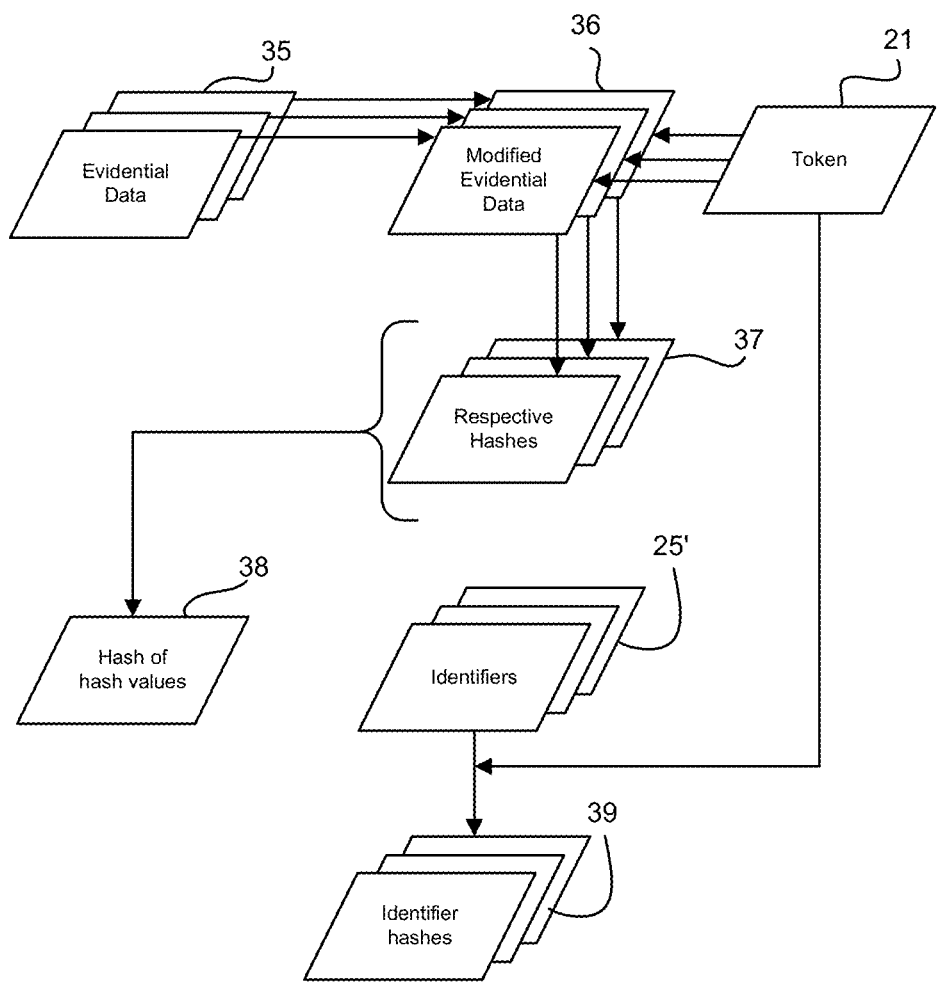
FIG. 6 is a flow diagram showing how the data is bundled while performing the processing of FIG. 5.

With reference to FIGS. 5 and 6, there is now described processing performed at the mobile device 1 for obtaining and transmitting evidential data to the server 2.

At step S15, the mobile device 1 obtains data 35 which is to be used for the purpose of evidence. The data 35 may comprise a plurality of data items. For example, the data 35 may comprise one or more still images obtained using the camera 1f of the mobile device 1, one or more videos captured using the camera 1f, one or more sound records obtained with the microphone 1g, etc. Where the data 35 comprises one or more video recordings, one or more of the video recordings may be separated into respective frames.

Processing passes to step S16 at which a first data item from the data 35 is selected. At step S17 the data item is combined with the token 21 in order to generate a modified data item 36. The token 21 may be combined with the data item in any appropriate way, such as, for example, prepending, appending or distributing the token throughout the data item according to a predetermined scheme known to both the mobile device 1 and the server 2. Processing passes from step S17 to step S18 at which a hash value 37 is generated based upon the modified data item 36. The hash value 37 maybe generated using any appropriate hashing algorithm. As examples only, the widely used SHA1 or SHA2 hashing algorithm, or the newer SHA3 algorithm, may be used.

Processing passes from step S18 to step S19 at which it is determined whether there are any further data items in the data 35. If it is determined that there are further data items, processing passes from step S19 to step S20 at which the next data item is selected. Processing passes from step S20 to step S17. Processing therefore loops between steps S17 to S20 until each of the data items in the data 35 has been processed so as to generate a plurality of respective modified data items 36 and a corresponding plurality of hash values 37.

When it is determined at step S19 that all data items in the data 35 have been processed, processing passes to step S21, at which a single hash value 38 is generated from a data bundle comprising each of the hash values 37. The data bundle does not comprise any data item in the data 35, but may comprise further data (such as, at least one of the identification data items 25) which is generally of a small data size. In this way, the data bundle is of a relatively small data size, and thus less computing resource is needed from the mobile device 1 to compute the single hash value 38 from the data bundle. This is beneficial for improving the operational speed and the battery life of the mobile device 1. In an example, the data bundle includes the hash values 37 only, and does not include any further data. The hash value 38 may additionally or alternatively be generated from the hash values 37 combined in some, known way, with the token 21.

At step S22, the data 35, together with the hash values 37 and the hash value 38 is transmitted to the server 2. The data 35 and the hash values 37 and 38 may collectively form a data message. By transmitting each of the hash values 37, together with the hash value 38, the server 2 is able to perform an initial check (based on the hash value 38) that the transmitted data message has not been modified during the transmission from the mobile device 1 to the server 2. In particular, upon receipt of the hash values 37, the server 2 is able to calculate a hash value that should, have the same value as the hash value 38. If it is discovered that the data message has been modified or corrupted, (because the hash value calculated by the server 2 does not match the hash value 38), because each of the hash values 37 are also transmitted, it is possible for the server 2 to subsequently verify whether the data 35 has been modified and, if so, to identify exactly which of the data items in the data 35 has been modified, corrupted, or not transmitted by the mobile device 1.

Additionally, one or more identifiers 25' may be transmitted along with the evidential data at step S22. The identifiers 25' may be referred to as transaction identifiers (as they are transmitted during a transaction) to distinguish them from the identifiers 25 which may be referred to as initialisation identifiers (as they are transmitted during an initialisation procedure).

The identifiers 25' may comprise one or more of the same identifiers 25 that are transmitted to the server 2 at step S10 of FIG. 3. For example, the server 2 may request, during a transaction, one or more specific identifiers (such as the IMEI number of the mobile device 1), or may request that identifiers corresponding to each of the identifiers 25 are included in the identifiers 25'. As described above, that while the identifiers 25' may include one or more of the same type of identifier included in the identifiers 25 (e.g. "date" type identifiers), it is to be expected that the value of one or more of the identifiers may differ between the identifiers 25 and the identifiers 25'. As described above, the identifiers which are expected to differ may be referred to as variable identifiers.

Like the data items in the data 35, each of the identifiers 25' may additionally be combined with the token 21 and hash values calculated therefrom in order to create a bundle of identifier hash values 39, which may be transmitted to the server 2. In some embodiments one or more of the hash values 39 are transmitted in place of the corresponding identifier 25'. For example, where the identifier 25' is a static identifier (such as an IMEI number, which may be expected to be the same as it was when the corresponding identifier 25 was sent), a hash 39 of the static identifier may be transmitted to the server 2, in place of re-sending the identifier. Where the static identifier is first modified using the token 21. In this way, further checks may be performed by the server 2 to improve confidence that the device transmitting the identifiers 25' is the mobile device 1.

The processing of FIG. 5 is such that when the data 35 is used as evidence, which may be after a period of storage at the server 2, the server 2 can determine that the data 35 has not been tampered with or otherwise corrupted (i.e. that the data 35 is suitable for evidential uses). In particular, as now described with reference to FIG. 7, only the server 2 is able to re-create the hash values 37, 38 based on the received data. That is, as only the server 2 knows the value of the token 21 (and the scheme used to combine the token 21 with the data items of the data 35), only the server is able to re-create the hash values. As such, successful re-creation of the hash values 37, 38 at the server 2 is evidence that the data items are authentic and unmodified. Further, the identifiers 25' and/or the identifier hash values 39 may be used to further confirm the identity of the mobile device 1.

In addition to, or as an alternative to, being transmitted to the server 2, the hash values 37, 38, 39 may be transmitted to an independent third party for secure storage until such a time as verification of the data 35 is required. Where both the server 2 and a third party receive the hash values 37, 38, 39, verification of the data 35 may be performed by both the server 2 and an independent third party. In an embodiment, some or all of the hash values 37, 38, 39 are sent only to the third party. In some embodiments, the server transmits token 21 to a third party which may be the same or a different third party to that which receives the hash values 37, 38, 39. It can be seen therefore, that independent verification of the data 35 may be provided by use of third parties unrelated to either the user of the mobile device 1 or the entity associated with the server 2.

Figure 7:
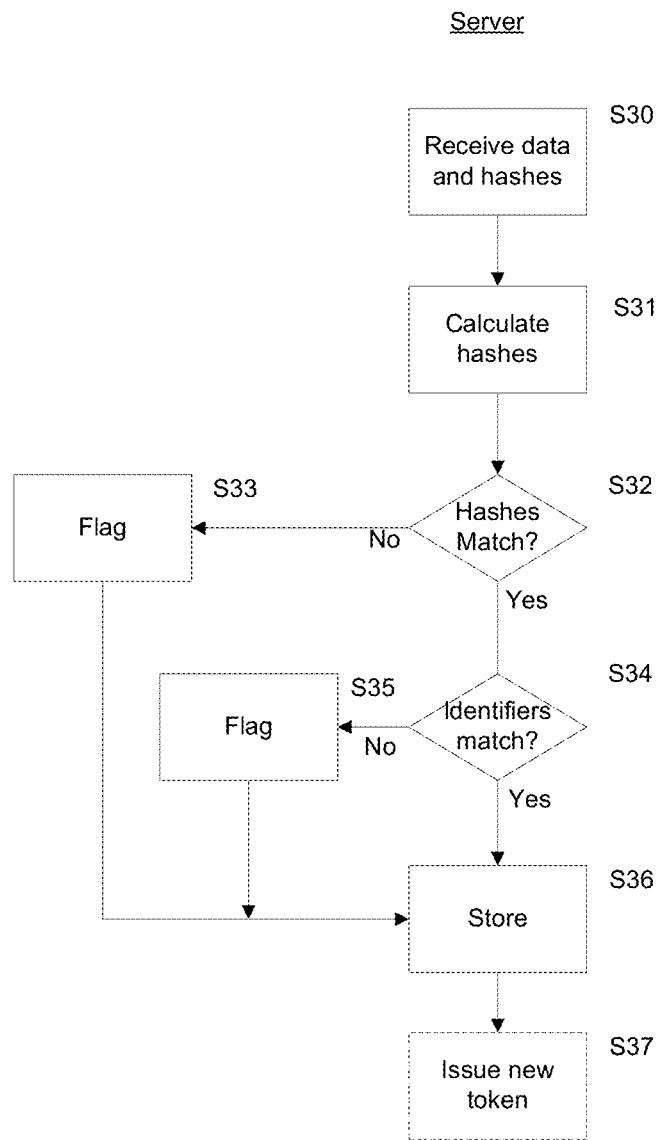
FIG. 7 is a flowchart showing processing carried out by the server to receive evidential data from the mobile device.

FIG. 7 illustrates processing that may be carried out at the server 2 upon receipt of evidential data from the mobile device 1 through the processing of FIG. 6. It will be appreciated the processing of FIG. 7, or similar processing may be carried out any stage after receipt of the data from the mobile device 1. For example, the processing of FIG. 7 (or similar) may be deferred until the data is to be used in an evidential fashion. For example, in the example above of vehicle insurance, processing to determine the veracity, authenticity and trustworthiness of data received from the mobile device 1 may be deferred until a particular claim is processed by an agent of the insurer, for example.

Referring to FIG. 7, at step S30, data sent by the mobile device 1 is received at the server 2. As described above, the data transmitted by the mobile device 1 comprises the data that is to be used as evidence, together with a plurality of hash values 37 (a respective hash value for each data item) and a single hash value 38 representing the hash values 37 as a bundle (which may or may not be combined with the token 21). Processing passes from step S30 to step S31 at which the server 2 calculates at least one hash value based upon the received data and the token 21 stored at the server 2.

In particular the server 2 may first calculate only the hash value 38. Respective hash values for each of the received data items may be calculated only in the event that the hash value 38 cannot be recreated by the server 2 in order to determine which data items are suspect. In other embodiments, the server 2 may calculate all of the hash values at the outset.

After calculating the hash values, processing passes to step S32 at which the hash values calculated by the server 2 are compared with the hash values received from the mobile device 1. If it is determined at step S32 that the hash values calculated by the server 2 do not match the hash values received from the mobile device 1, this indicates that the received data may have, for example, been modified, been corrupted during transmission, or originated from a device other than the mobile device 1 (such that the other device did not know the value of the pre-shared token 21). Where the hash values do not match, this may indicate that the data received at the server 2 is not suitable for use as evidence. Processing passes from step S32 to step S33.

At step S33, an indication is provided (for example, an indication may be output to the display 2e of the server 2, output to the display 1e mobile device 1, and/or saved together with the received data at the server 2) that the calculated hash values do not match the received hash values. It will be appreciated that additional processing may be performed upon determination at step S32 that the hash values do not match. For example, the received data may be rejected, and a message may be sent from the server 2 to the mobile device 1 requesting that the data be re-transmitted. Other processing that may be performed will be readily apparent to the skilled person.

If, on the other hand, it is determined at step S32 that the hash values calculated by the server 2 do match the hash values received from the mobile device 1, processing passes from step S32 to step S34 at which it is determined whether the one or more of the identifiers 25' match the identifiers 25 that were sent from the mobile device 1 to the server 2 during the processing of FIG. 3 and/or whether the identifier hash values 39 match corresponding hash values calculated by the server 2 based upon the identifiers 25 received during the processing of FIG. 3. It is to be understood that not all of the identifiers are necessarily checked at step S34.

If it is determined at step S34 that the examined one or more identifiers 25' do not match the corresponding identifiers 25 and/or that the identifier hash values 39 do not match corresponding hash values calculated by the server 2 based upon the identifiers 25, processing passes from step S34 to step S35, at which an indication is provided (for example, an indication may be output on the server 2, output on the mobile device 1, or saved together with the received data) that the identifiers 25 do not match the identifiers 25' and/or that the calculated hash values do not match the received hash values 39. It will be appreciated that additional processing may be performed at step S35. For example, the data may be rejected, and a message may be sent from the server 2 to the mobile device 1 requesting that the data be re-transmitted. Other processing that may be performed will be readily apparent to the skilled person.

If, on the other hand, it is determined at step S34 that the received identifiers 25' do match the stored identifiers 25, and/or that the received hash values 39 do match the calculated hash values, processing passes to step S36, at which the received data is stored for later use. Storage of the data may be, for example, on both the storage device 4 and the storage device 5. Data stored on the storage device 4 may be accessible (for example for viewing, annotating, modification, etc.) by the mobile device 1, while data stored at the storage device 5 may be inaccessible to the mobile device 1. In this way, data stored at the storage device 5 may be used to confirm that data stored at the mobile device 4 has not been modified in such a way that it can no longer be used for evidential purposes.

After each receipt of data, a new token may be exchanged between the server 2 and the mobile device 1 at a step S35. As described above with reference to the processing of FIG. 3, a new token may be generated and exchanged in any appropriate way. For example, a new token may be selected randomly by one of the server 2 or the mobile device 1 and transmitted to the other device using public key cryptography. Alternatively, the server 2 may be issue a new token to the mobile device 1, which the mobile device 1 salts with information known only to the mobile device 1 and the server 2 (such as one of the identifiers 25, 25', a transaction number, etc.).

It will be appreciated, that even in the event that the data 35 is identified as originating from the mobile device 1, and has not been modified or corrupted before receipt at the server 2, it may be further desired to determine that the data 35 is trustworthy (i.e. that the user of the mobile device 1 has not fabricated the data 35). As will be described in more detail below, the identifiers 25' may additionally be used to provide indications as to whether the data 35 is trustworthy.

After receiving data from the mobile device 1 during a transaction, the server 2 may perform background processing to compare the identifiers 25 with the identifiers 25' to determine if the identifiers 25' are valid or plausible in light of the identifiers 25. For example, where the identifiers 25 and 25' each include one or more time-based identifiers (such as a current time or date), it may be determined whether the time-based identifiers in the identifiers 25 precede the time-based identifiers in the identifiers 25'. As a further example, where the identifiers 25, 25' each include a location based identifier (such as a GPS location, a current cell location, etc.) it may be determined whether it is feasible that the mobile device 1 could have reached the location indicated in the identifiers 25' given the location indicated in the identifiers 25. Determining whether a location is feasible may comprise comparing a distance between locations identified in each of the identifiers 25, 25' with respect to a time indication. As a further example, where the identifiers 25, 25' include hardware identifiers of the mobile device 1 (for example, battery serial number, IMEI number, phone uptime, last reboot, start time, etc.), comparisons may be made to identify inconsistencies.

It will be appreciated that a plurality of consistency checks may be performed based upon the identifiers 25, 25'. It will further be appreciated that in many cases, the data received at the server 2 may be accepted for storage even in the event of inconsistencies in the identifiers 25, 25', where inconsistencies are merely noted along with the received data so that identified inconsistencies can be taken into account when assessing whether the received data is suitable for use as evidence. In other embodiments, however, determined inconsistencies may be used to automatically reject received data and/or trigger other processing such as requests for additional information.

It is described above that the initialisation process comprises the exchange of identifiers which are utilised for comparison in further transactions. In other embodiments, initialisation does not comprise the transfer of such identifiers. In some embodiments identifiers may be transferred during each transaction and compared across different transactions.

In some embodiments, identifiers are transferred outside of transactions or initialisation procedures, such that the sever 2 maintains a regularly updated copy of relevant identifiers. For example, an application operating on the mobile device 1 may be arranged to transfer one or more identifiers to the server 2 in background processing operations. Alternatively, the application may prompt a user of the mobile device 1 to authorise transmission of identifiers outside of transactions initiated by the user. Such prompts or background processing operations may be at regular or random intervals.

It will be appreciated that aspects can be implemented in any convenient way including by way of suitable hardware and/or software. For example, devices arranged to implement embodiments may be created using appropriate hardware components. Alternatively, a programmable device may be programmed to implement embodiments.

The invention therefore also provides suitable computer programs for implementing aspects. Such computer programs can be carried on suitable carrier media including non-transitory (i.e., tangible) carrier media (e.g. hard disks, CD ROMs and so on) and intangible carrier media such as communications signals.

It will further be appreciated that while example embodiments are described above, modifications may be made to those examples without departing from the scope of the appended claims.

What is claimed is:

1. A method for providing evidential data, comprising at a mobile device:
    obtaining one or more data items from one or more sensors, wherein the one or more data items comprise at least one of: one or more still images, one or more videos, and one or more sound recordings;
    generating a respective first hash value based at least in part on each of the one or more data items, thereby generating one or more first hash values;
    generating a second hash value for a data set, wherein the data set comprises each of the one or more first hash values but excludes the one or more data items;
    obtaining one or more transaction identifiers, the one or more transaction identifiers including one or more static identifiers that identify a static property of the mobile device;
    generating a respective third hash value for each of the one or more static identifiers; and
    transmitting a first message comprising the one or more data items, the one or more first hash values, the second hash value, and the one or more third hash values to a server, wherein the second hash value enables the server to confirm that the first message has not been modified, and wherein the one or more third hash values enable the server to confirm the identity of the mobile device.

2. The method of claim 1, wherein the data set consists of each of the one or more first hash values.

3. The method of claim 1, wherein each transaction identifier is suitable for identifying a property of the mobile device.

4. The method of claim 3, wherein each static identifier is suitable for identifying a static property of the mobile device.

5. The method of claim 1, wherein generating each respective third hash value comprises modifying each of the plurality of static identifiers with at least one of one or more first secret tokens established with the mobile device and calculating each of said third hash values based upon the modified static identifiers.

6. The method of claim 1, wherein:
    the transaction identifiers comprise one or more variable identifiers and wherein each variable identifier is suitable for identifying a variable property of the mobile device;
    the method further comprises transmitting an indication of the variable identifiers to the server, wherein transmitting the indication of the variable identifiers comprises transmitting the variable identifier to the server.

7. The method of claim 6, wherein the one or more variable identifiers comprise at least one identifier from the group consisting of: a geographical location of the mobile device, a date and time reported by the mobile device, a duration of time since the mobile device was turned on, an indication of other devices detected by the mobile device and a file structure of the mobile device.

8. The method of claim 1, further comprising an initialisation procedure, the initialisation procedure comprising transmitting a plurality of initialisation identifiers to the server.

9. The method of claim 8, wherein the initialisation identifiers comprise one or more static identifiers and/or one or more variable identifiers.

10. The method of claim 8, wherein the transaction identifiers are based upon the initialisation identifiers to allow comparison at the server between values of the initialisation identifiers and the transaction identifiers.

11. The method of claim 1, wherein the one or more sensors comprise at least one sensor from a group comprising a camera of the mobile device and a microphone of the mobile device.

12. The method of claim 1, wherein the one or more static identifiers comprise at least one identifier from a group consisting of: an identification number of a battery of the mobile device, an IMEI number of the mobile device, and a telephone number of the mobile device.

13. A method for receiving evidential data comprising, at a server:
    receiving a plurality of initialization identifiers including a first static identifier from a mobile device;
    receiving a first message which comprises one or more first data items, one or more first hash values, a second hash value, and a third hash value from the mobile device, the one or more data items obtained from one or more sensors and comprising at least one of: one or more still images, one or more videos, and one or more sound recordings, wherein each of the one or more first hash values are hash values generated based at least in part upon a respective one of the one or more first data items, and the second hash value is a hash value generated based upon a data set, wherein the data set comprises each of the one or more first hash values but excludes the one or more data items, and wherein the third hash value is based on a corresponding static identifier associated with the mobile device;
    determining, based on the second hash value, whether the first message has been modified; and
    comparing the first static identifier with the corresponding static identifier, wherein the comparing comprises generating a fourth hash value based upon the first static identifier and comparing the fourth hash value with the third hash value to confirm the identity of the mobile device.

14. The method of claim 13, further comprising:
    modifying each of the received one or more data items with at least one of one or more first secret tokens established with the mobile device;
    generating a respective first comparison hash value for each of the modified received one or more data items;
    comparing each respective first comparison hash value to a corresponding one of the first hash values; and
    providing an indication for each respective first comparison hash value that does not match a corresponding one of the first hash values.

15. The method of claim 13, wherein each of the one or more transaction identifiers is suitable for identifying a property of the mobile device.

16. The method of claim 13, wherein the first static identifier is suitable for identifying a static property of the mobile device.

17. The method of claim 13, wherein the third hash value was generated by the mobile device by modifying the corresponding static identifier with at least one of one or more first secret tokens established with the mobile device and calculating each the third hash values based upon the modified corresponding static identifier; and wherein generating the fourth hash value comprises modifying the first static identifier with at least one of the one or more first secret tokens and calculating the fourth hash value based upon the modified first static identifier.

18. The method of claim 13, wherein the initialisation identifiers comprise a first variable identifier suitable for indicating a variable property of the mobile device;

wherein the received transaction identifiers comprise a corresponding variable identifier;

wherein the method further comprises comparing the first variable identifier with the corresponding variable identifier, and wherein the comparing comprises determining whether a difference between the first variable identifier and the second variable identifier is within a predetermined bound.

19. A non-transitory computer-readable storage medium storing a set of instructions for execution by a general purpose computer to provide evidential data at a mobile device, wherein the set of instructions, when executed by the general purpose computer, cause the general purpose computer to:

obtain one or more data items from one or more sensors, wherein the one or more data items comprise at least one of: one or more still images, one or more videos, and one or more sound recordings;

generate a respective first hash value based at least in part on each of the one or more data items, thereby generating one or more first hash values;

generate a second hash value for a data set, wherein the data set comprises each of the one or more first hash values but excludes the one or more data items;

obtain one or more transaction identifiers, the one or more transaction identifiers including one or more static identifiers that identify a static property of the mobile device;

generate a respective third hash value for each of the one or more static identifiers; and transmit a first message comprising the one or more data items, the one or more first hash values, the second hash value, and the one or more third hash values to the server, wherein the second hash value enables the server to confirm that the first message has not been modified, and wherein the one or more third hash values enable the server to confirm the identity of the mobile device.

* * * * *